Patented June 3, 1947

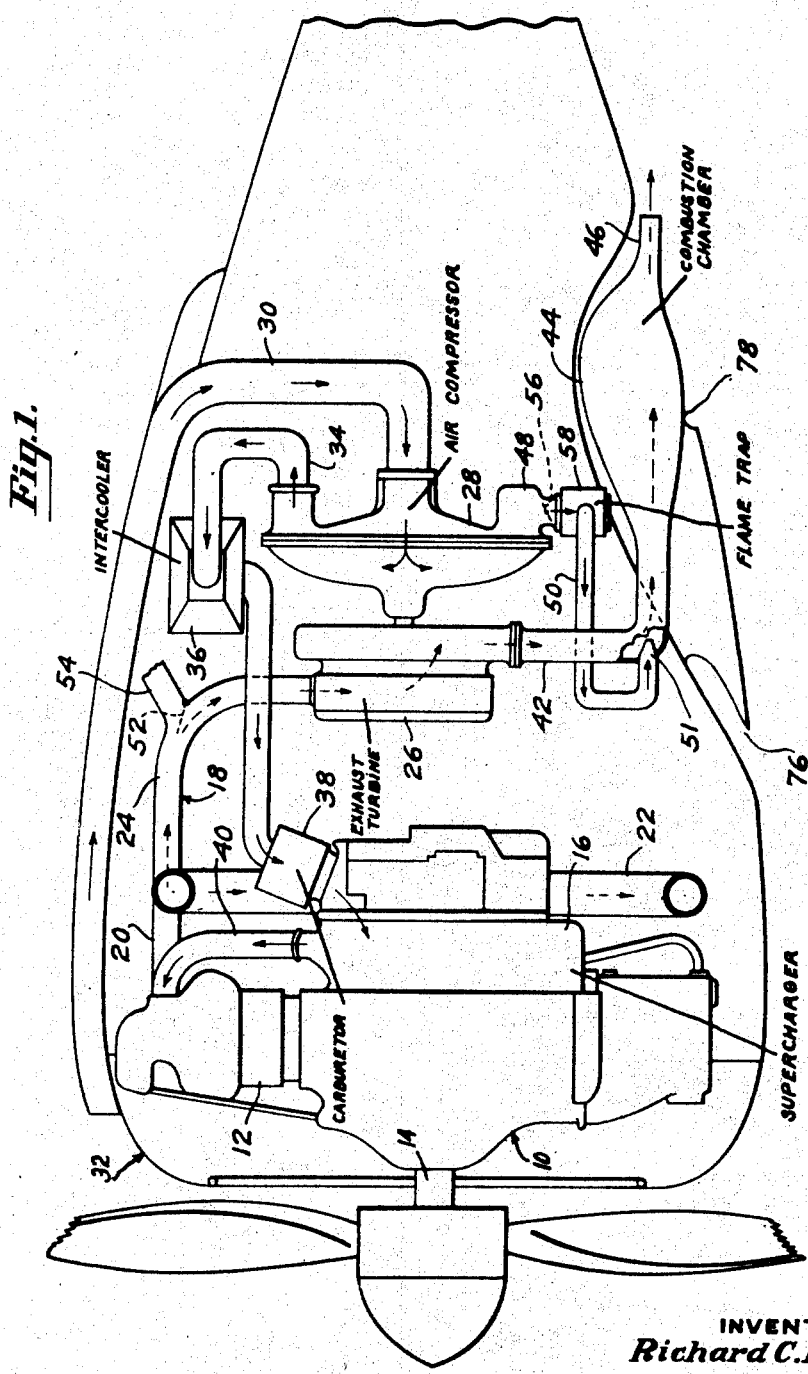

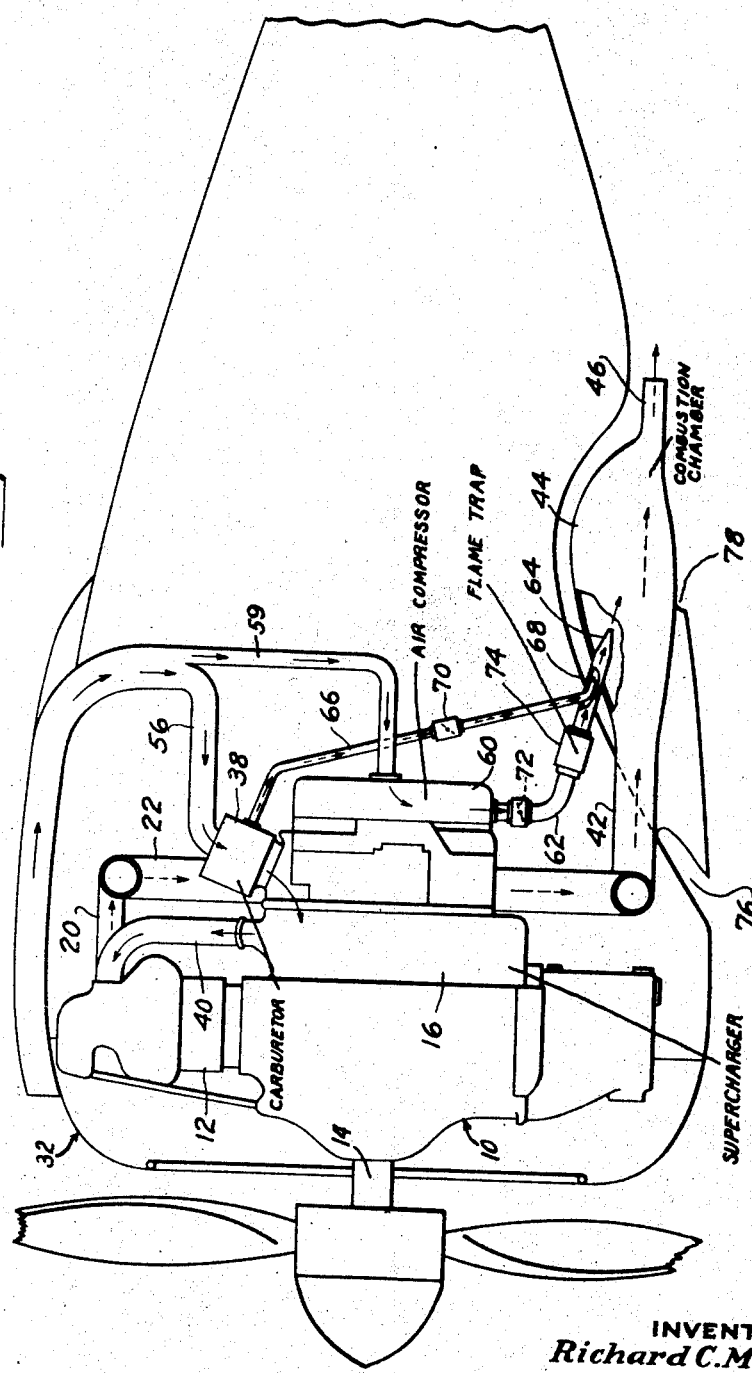

2,421,518

UNITED STATES PATENT OFFICE 2,421,518

JET PROPULSION

Richard C. Molloy, Glastonbury, Conn., assignor to United Aircraft Corporation, East Hartford, Conn., a corporation of Delaware Application July 5, 1940, Serial No. 343,993

1 Claim. (Cl. 170—135.5)

This invention relates to improvements in vehicle power plants and has for an object the provision of improved means for utilizing the heat and dynamic energy of exhaust gases to increase the tractive effort of the power plant.

A further object resides in the provision in connection with a vehicle power plant of the internal-combustion-engine type of means for utilizing the residual energy in the engine exhaust gases for supercharging the engine and adding to the tractive effort thereof.

A still further object resides in the provision in a vehicle power plant including an internal combustion engine of means for completing the combustion of combustible material in the exhaust gases and utilizing the energy of the exhaust gases to produce a reactive jet for increasing the tractive effort of the power plant.

Another object resides in the provision in a power plant of the character indicated of means for utilizing the residual energy of the exhaust gases for producing a reactive jet to increase the tractive effort of the power plant, and means for injecting additional fuel and supercharged air into the exhaust ducts to increase the propulsive effect of the reactive jet whenever such increased effect is desired.

An additional object is to allow the cooling of the explosive charge in the engine cylinders by permitting the use of an excess of fuel over that which could be economically justified without the use of the present invention, which would reduce the detonation tendency of the mixture and allow the use of higher manifold pressures and engine powers if the engine were not already at full throttle.

Other objects and advantages will be more particularly pointed out hereinafter or will become apparent as the description proceeds.

In the accompanying drawings, in which like reference numerals are used to designate similar parts throughout there are shown two slightly different arrangements for disclosing the invention. The drawings, however, are for the purpose of illustration only and are not to be taken as limiting or restricting the invention since it will be apparent to those skilled in the art that various changes in the illustrated arrangement may be resorted to without in any way exceeding the scope of the invention.

In the drawings:

Fig. 1 is a somewhat diagrammatic view of a vehicle power plant including an internal combustion engine and engine exhaust discharge conduits with means for utilizing the residual energy of the exhaust gases to supercharge the engine, complete combustion of the gases, and provide a rearwardly directed reactive jet, and Fig. 2 is a schematic view similar to Fig. 1 showing means for utilizing the residual energy of the exhaust gases to provide a rearwardly directed reactive jet and means for increasing the effectiveness of such a jet by the addition of fuel and air to the exhaust gases before the gases leave the discharge conduits.

Referring to the drawings in detail and particularly to Fig. 1, the numeral 10 generally indicates an internal combustion engine which may be a radial air cooled engine such as is conventionally employed for the propulsion of aircraft although the invention is in no way limited to any particular type of internal combustion engine. Such an engine may have a plurality of cylinders, one of which is indicated at 12, a drive shaft as indicated at 14, which may drive a propulsive mechanism such as an aeronautical propeller, not illustrated, a supercharger diffuser section 16 for distributing combustible mixtures to the various engine cylinders and exhaust discharge conduits as generally indicated at 18. The exhaust discharge system may include individual cylinder stacks, one of which is indicated at 20, a collector ring as indicated at 22 and a discharge duct 24 which may lead from the exhaust collector ring to the inlet of an exhaust turbine 26. The turbine 26 may drive a rotary compressor 28 the inlet 30 of which extends to the exterior of the engine cowl or nacelle, generally indicated at 32, and the outlet 34 of which may be connected through an intercooler 36 with the engine carburetor 38 mounted on the engine adjacent to the diffuser section 16. The diffuser section may be connected with the various cylinders by individual intake pipes one of which is indicated at 40.

The outlet 42 of the turbine 26 leads into a combustion chamber 44 which terminates in a rearwardly directed nozzle 46. The pressure portion of the rotary compressor 28 is connected through suitable means such as the outlet 48, conduit 50 and nozzle 51 with the interior of the combustion chamber 44 to force air into the exhaust gases in this combustion chamber so that the air mixing with the hot exhaust gases from the turbine outlet will cause combustion of any combustible material remaining in the exhaust gases as they enter the combustion chamber 44. The combustion chamber 44 is so shaped that as the exhaust gases expand due to further combustion and additional heat content there will be a considerable increase in pressure which can be transferred into velocity energy by means of the nozzle 46. As the exhaust gas is ejected at high speed from the nozzle 46 the reaction to the expulsive force will be transmitted through the nozzle and combustion chamber to the vehicle upon which the engine is mounted thereby adding the residual energy in the exhaust gases to the tractive effort produced by the engine 10.

The speed of the turbine 26 may be controlled by a valve or waste gate 52 disposed between the exhaust duct leading to the turbine intake and a vent duct 54 and the supply of air from the compressor 28 to the combustion chamber 44 may be controlled by a valve 56. A pressure relief valve, or a flame or backfire damper 58, which may be a check valve opening in the direction of normal gas flow, or a mass of porous heat absorbing material such as "metal wool" may be disposed adjacent the compressor connected end of the conduit 50 to avoid subjecting the compressor to excessive back pressures or explosive forces.

A particular advantage of the arrangement shown in Fig. 1 is that full use can be made of the available heat content of the exhaust gases, whether the fuel-air ratio of the charge in the engine cylinders is purposely high to avoid detonation or not. Ordinarily, as engines are now operated, this available energy in the exhaust gas would be wasted.

In the form of the invention shown in Fig. 2 the exhaust turbine and turbine driven compressor are omitted and the intake air is carried directly to the carburetor 38 through the duct 56. The air delivered to the cylinders is compressed by an engine gear driven supercharger. A portion of this intake air is diverted through the duct 59 and carried to the intake of an auxiliary engine driven compressor 60 the outlet of which is connected through a conduit 62 with a nozzle 64 in the combustion chamber 44 to force an additional supply of air into the exhaust gases flowing through the combustion chamber. A conduit 66 leads from the carburetor 38 to a nozzle 68 in the duct 62 to inject an additional supply of fuel into the air flowing into the combustion chamber, the supply of fuel through the conduit 66 being controlled by a suitable valve such as is indicated at 70. The airflow through the conduit 62 may be controlled by a suitable valve 72 and a pressure relief valve or flame trap 74 may be provided in the air duct to protect the compressor 60.

With this arrangement the residual heat energy as well as the velocity energy of the exhaust gases are utilized to provide a rearwardly directed jet producing a forwardly directed reactive force on the power plant and the force exerted by this jet is increased by the injection and combustion of additional fuel in the combustion chamber when it is necessary or desired to increase the tractive effort of the engine by this means. In both cases the efficiency of the power plant is materially increased at high airplane speeds by utilizing all of the residual energy of the engine exhaust gases to increase the tractive effort produced by the engine. The jet producing mechanism including the combustion chamber 44 is maintained within the contour of the cowl or nacelle 32 so that substantially no additional drag will be produced by the inclusion of the jet producing apparatus. A receptacle for the combustion chamber may be provided in the nacelle and this receptacle may be provided with an air entrance gap 76 and an air exit gap 78 to provide a stream of cooling air along the exterior of the combustion chamber.

While two slightly different arrangements have been hereinabove described and illustrated in the accompanying drawings for the purpose of disclosing the invention, it is to be understood that the invention is not limited to the particular arrangements so described and illustrated but that such changes in the size, shape and arrangements of the various parts may be resorted to as come within the scope of the sub-joined claim.

Having now described the invention so that others skilled in the art may clearly understand the same, what it is desired to secure by Letters Patent is as follows:

In an aircraft powerplant including an internal combustion engine having fuel and air supplying means for operating said engine at high power output with an excess of fuel over that required for combustion, an exhaust manifold for receiving exhaust gas including excess unburned fuel from said engine, an air compressor, an exhaust gas turbine drivingly connected with said air compressor and operatively connected with said engine exhaust manifold, an engine driven propeller for producing a propulsive thrust, and means independent of said propeller for augmenting the propeller thrust, said means comprising; a combustion chamber, a rearwardly directed nozzle located downstream of said combustion chamber for directing products of combustion from said combustion chamber into the atmosphere as a rearwardly directed gas jet exerting a propulsive reactive thrust, means for conducting the engine exhaust gas including unburned fuel from said engine through said turbine into said chamber, and means for burning said fuel in said chamber including means for introducing compressed air from said air compressor into said exhaust gas and unburned fuel downstream of said turbine and upstream of said nozzle so as to complete the combustion of said exhaust gas in said combustion chamber before said gas is ejected from said nozzle, and valve means for proportioning the quantity of compressed air introduced into said exhaust gas and unburned fuel so as to produce a combustible mixture of fuel and air in said combustion chamber.

RICHARD C. MOLLOY.

REFERENCES CITED

The following references are of record in the file of this patent:

UNITED STATES PATENTS

| Number | Name | Date |
|---|---|---|
| 1,382,535 | Offen | June 21, 1921 |
| 2,164,545 | Rogers | July 4, 1939 |
| 958,944 | Steward | May 24, 1910 |
| 2,169,243 | Higbie | Aug. 15, 1939 |
| 2,216,731 | Birmann | Oct. 8, 1940 |
| 2,385,366 | Lysholm | Sept. 25, 1945 |

FOREIGN PATENTS

| Number | Country | Date |
|---|---|---|
| 321,933 | Great Britain | Nov. 19, 1929 |
| 696,369 | France | Oct. 14, 1930 |
| 818,703 | France | June 21, 1937 |
| 471,177 | Great Britain | Aug. 30, 1937 |
| 309,273 | Italy | July 1, 1933 |
| 513,751 | Great Britain | Oct. 20, 1939 |
| 454,266 | Great Britain | Sept. 28, 1936 |
| 844,442 | France | Apr. 24, 1939 |